June 19, 1934. G. E. GAUS 1,963,359
WIRE BALE TIE
Filed Dec. 16, 1932
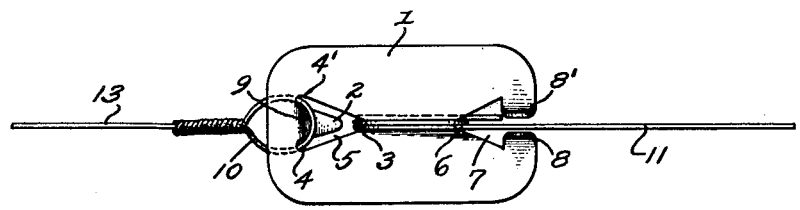
Fig. 1.
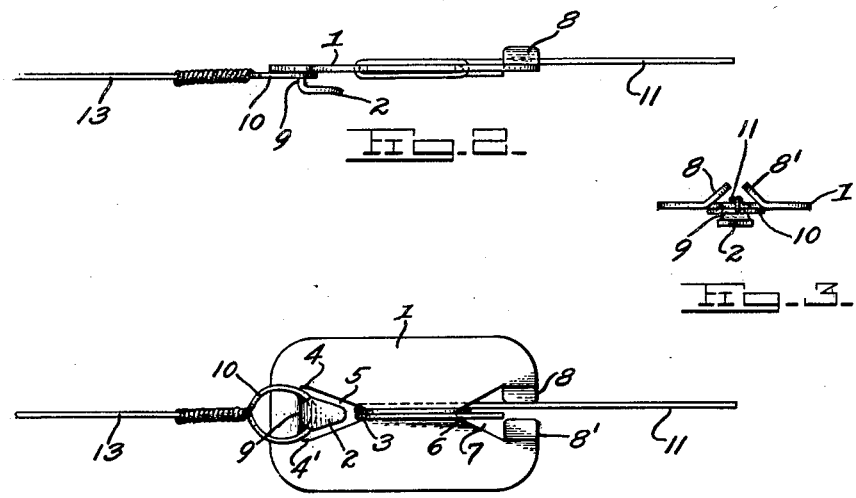
Fig. 2.
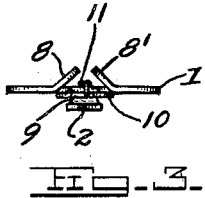
Fig. 3.
Fig. 4.
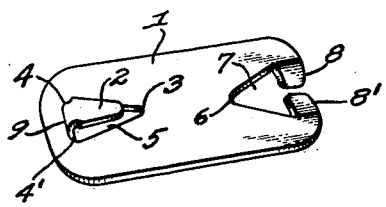
Fig. 5.
INVENTOR
George E. Gaus
By:
Attorney.

Patented June 19, 1934

1,963,359

UNITED STATES PATENT OFFICE 1,963,359

WIRE BALE TIE

George E. Gaus, Washington, D. C., dedicated to the free use of the Government and the People Application December 16, 1932, Serial No. 647,603

2 Claims. (Cl. 24—28)

(Granted under the act of March 3, 1883, as amended April 30, 1928; 370 O. G. 757)

This application is made under the act of March 3, 1883, as amended by the act of April 30, 1928, and the invention herein described may be manufactured and used by or for the Government for governmental purposes without the payment to me of any royalty thereon.

I hereby dedicate this invention to the free use of the Government and the People of the United States.

My invention relates to that class of ties or bands formed of wire, and has for its primary object to provide a metallic bale tie or fastener of simple, and inexpensive construction, permitting the tying of the wire without special tools.

My invention also provides gripping or clamping surfaces, overcoming the tendency of the bale wire ends from separating under strain, or expansive pressure of the baled material.

My invention also provides means for covering the free or snag end of the bale wire and retaining it in close contact with the baled material, thus obviating danger of any physical injury resulting from the protruding end of the wire, upon handling the baled material.

In order to carry out the purposes of my invention, reference is to be had to the peculiar combination and arrangement of parts as shown in the accompanying drawing, forming a part of this specification, in which similar numerals refer to similar parts throughout the several views.

Figure I is a front view of my bale-tie or fastener as usually applied in practice, with bale wire attached.

Figure II illustrates a side view of my bale-tie or fastener with a bale wire in interlocking position.

Figure III is an end view of my bale-tie or fastener with a bale wire in interlocking position.

Figure IV is a back view of my bale-tie or fastener as usually applied in practice, with bale wire attached.

Figure V is a perspective view of the back of my bale-tie or fastener.

Referring to the drawing, tie-plate 1, of any suitable material, represents the body of my fastener. Integral depressed tongue 2, of triangular shape, is at one end of tie-plate 1, and projections 8 and 8' are cut and raised at the other end, as shown.

Circular opening 3 cut into tie-plate 1 within triangular opening 5, as shown, is slightly less than twice the diameter of bale wire 13.

Circular openings 4 and 4', cut into tie-plate 1 within triangular opening 5, as shown, are slightly greater in diameter than bale wire 13.

Circular opening 6 cut into tie-plate 1 within triangular opening 7, as shown, is slightly less in diameter than loose end 11 of bale wire 13.

Circular openings 3, 4, 4' and 6 have been located at the pinching angles of triangular openings 5 and 7 to facilitate close contact of the bale wire with the body of the tie-plate and at the same time preventing the cutting of bale wire held in contact with the sides of triangular openings 5 and 7.

The depressed tongue; gripping triangular openings; and, raised projections, are centrally located with respect to the longitudinal bisector of the plate, thereby maintaining the ends of the bale wire in strict alignment.

Raised projections on the end of the tie-plate prevent excessive lateral motion of the tie-plate in relation to the bale wire encircling the bale.

To practice my invention, loop 10 of bale wire 13 is coupled to tie-plate 1 by placing loop 10 about root 9 of depressed tongue 2 within circular openings 4 and 4'. Depressed tongue 2 is on the underside of tie-plate 1 and adjacent to the surface of the bale. Bale wire 13 is then passed around the girth of the bale in the conventional manner. Loose end of bale wire 13 is passed between projections 8 and 8' over the front of tie-plate 1, thrust through triangular opening 5 and brought into contact with circular opening 3. It is then thrust downwardly and passed behind tie-plate 1, bent at right angles to itself, and thrust through triangular opening 7, bent upwardly and in contact with circular opening 6, and then passed over the front of tie-plate 1. It is again thrust through triangular opening 5, brought into contact with circular opening 3, and pressed downwardly and in close contact with the back of tie-plate 1.

From the foregoing, there is taught that a secure fastener for bale wire 13 is formed when loop 10 is coupled to the tie-plate by engaging it with the root of the depressed tongue and the circular openings adjacent thereto, and by placing loose end 11 of the bale wire between the raised projections, engaging it with the circular openings in the apexes of the triangular openings, and subjecting it to the gripping action of the sides of these triangular openings, this end of the bale wire is thereby brought into intimate contact with and secured by my device. The snag end of the bale wire is positioned beneath the tie-plate adjacent to the surface of the bale and obviates any danger of physical injury during handling of the baled material.

Loop 10 is further secured to tie-plate 1 due to the closing action of depressed tongue 2 when subjected to the expansive pressure of the baled material.

Having thus described my invention, I claim as new and desire to secure by Letters Patent:

1. A fastening device adapted to retain a bale securing wire, comprising a flat plate provided longitudinally with two triangular openings having their vertical angles opposed, the sides of said triangular openings terminating with circular apertures, the loose end of the wire passing through said triangular openings and bent around the central portion of the plate lying between said triangular openings, having the bends in the wire clutched at the circular apertures, and means at one end of the plate for engaging the other end of the bale wire together with means at the opposite end of the plate, on the side reverse that of the engaging means, restricting its lateral motion.

2. In combination, in a fastening device for a bale wire provided at one end with a loop, with a flat plate, a triangular shape tongue longitudinally disposed of said plate providing a longitudinally triangular shape opening, said tongue having its base integral with the plate and parallel to one end of said plate, said triangular shape opening provided at its included angles with circular apertures to admit the passage of the wire in close contact with the tie-plate without cutting, and a second triangular shape opening cut longitudinally from the plate having its base parallel to the end of said plate opposite to the aforementioned tongue, said second triangular shape opening provided at its vertical angle with a circular aperture to admit the passage of the loose end of the wire in close contact with the tie-plate without cutting, and providing at the base of the aforementioned second triangular shape opening two raised members projecting from the side of the plate reverse that of the aforementioned triangular shape tongue, said projections admitting the passage of the loose end of the wire between them, said tongue, openings, circular apertures and projections acting in combination to hold in alignment and lock the bale tie, without exposing its extremity.

GEORGE E. GAUS.